United States Patent [19]

Örevik et al.

[11] Patent Number: 4,572,552
[45] Date of Patent: Feb. 25, 1986

[54] CLIP FOR PIPES, HOSES AND THE LIKE

[75] Inventors: Sune A. W. Örevik, Huddinge; Torsten R. Grönberg, Nacka, both of Sweden

[73] Assignee: Telefonaktiebolaget L M Ericsson, Stockholm, Sweden

[21] Appl. No.: 676,662

[22] PCT Filed: Mar. 6, 1984

[86] PCT No.: PCT/SE84/00080
§ 371 Date: Nov. 30, 1984
§ 102(e) Date: Nov. 30, 1984

[87] PCT Pub. No.: WO84/03927
PCT Pub. Date: Oct. 11, 1984

[30] Foreign Application Priority Data

Mar. 31, 1983 [SE] Sweden ............................ 8301838

[51] Int. Cl.4 ............................................. F16L 33/00
[52] U.S. Cl. ...................................... 285/253; 285/93; 285/420; 24/205; 24/271
[58] Field of Search .................. 285/253, 252, 93, 420; 24/19, 205, 201.5, 271, 275, 279, 280

[56] References Cited

U.S. PATENT DOCUMENTS

| 907,542 | 12/1908 | Vogel | 24/20 LS X |
| 2,659,954 | 11/1953 | Woolsey | 24/279 |
| 3,765,066 | 10/1973 | Nitz | 24/279 |
| 3,879,811 | 4/1975 | Leverton | 285/253 X |

FOREIGN PATENT DOCUMENTS

| 457749 | 3/1928 | Fed. Rep. of Germany | 285/253 |
| 8205871 | 10/1982 | Sweden . | |

Primary Examiner—Richard J. Scanlan, Jr.
Attorney, Agent, or Firm—Roberts, Spiecens & Cohen

[57] ABSTRACT

A clip for sealingly connecting to a nipple, a pipe of a material that cold flows when subjected to prolonged mechanical pressure. The clip includes a constriction band intended to encircle the pipe and adapted for tensioning by a screw, which is rotatably mounted in a holder. One end of the band is secured to a nut travelling along the screw when the latter is turned, while the other end of the band coacts with one leg of a U-shaped spring for bringing the legs of the U-shaped spring together when the band is tightened around the pipe upon rotation of the screw. An indication element is held between the holder and the U-shaped spring for automatically indicating when predetermined relative travel of the legs of the spring has been attained.

6 Claims, 3 Drawing Figures

CLIP FOR PIPES, HOSES AND THE LIKE

FIELD OF THE INVENTION

The present invention relates to a clip for sealingly connecting to a nipple, pipe stub or the like, a pipe, hose or the like, of a material with a tendency to cold flow, the clip including a constriction band, adapted to encircle the pipe, hose or the like and arranged to be tightened with a screw which is rotatably mounted in a holder.

BACKGROUND

In modern piping systems, the use of pipes made from plastics or the like, is becoming increasingly common. These materials have a tendency to cold flow, i.e. to undergo slow change in shape when they are subjected to mechanical pressure over a period of time. This causes problems concerning connection of the pipes to nipples, pipe stubs and the like, since clips known up to now were designed for pipes of elastic material such as rubber. It is thus necessary to retighten the clips at periodic intervals, if such clips are used on pipes having a cold flow tendency.

SUMMARY OF THE INVENTION

The main object of the present invention consists of providing a clip that automatically maintains a sufficient sealing pressure, in spite of cold flow in the material of the pipe.

Another object of the invention consists in providing a clip which applies to the material of the pipe a sufficiently large, immediate deformation such that an immediate seal is achieved.

A still further object of the invention consists in providing a clip that achieves a balance between the continuous pressure that the pipe material can withstand and the pressure exerted by the constriction band, such that the cold flow is restricted.

These objects are attained by the clip in accordance with the invention by the construction comprising a constriction band encircling the pipe and nipple to be connected, said band having overlapping ends adapted for displacement in relation to each other, a nut rigidly attached to one end of the band, a threaded spindle supporting said nut for travel thereon upon rotation of the spindle for displacing said one end of the band relative to the other and a resilient, U-shaped element accommodating the band and including legs straddling the band, the other end of the band being secured to one leg of said U-shaped element, said threaded spindle being mounted for rotation in the other leg of said U-shaped element, and disposed substantially in the central plane of the band.

BRIEF DESCRIPTION OF THE FIGURES OF THE DRAWING

The invention is described in detail below with reference to the accompanying drawing, in which.

DETAILED DESCRIPTION OF A BEST MODE FOR CARRYING OUT THE INVENTION

Figure 1:
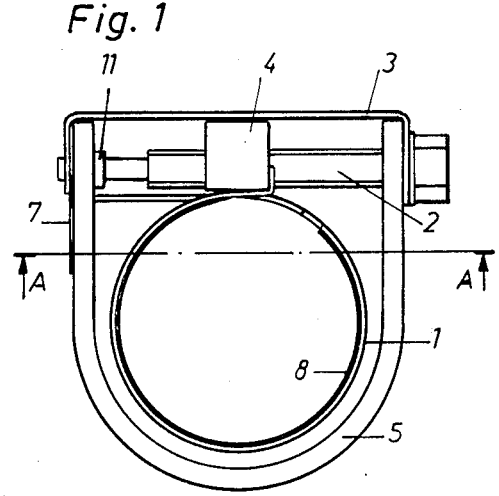
FIG. 1 is a side view of one embodiment of a clip in accordance with the invention.

A side view of an embodiment of a clip in accordance with the invention is shown in FIG. 1, the clip including a constriction band 1, adapted to encircle a pipe; hose or the like, not shown made from a material with a tendency to cold flow, e.g. plastics. The constriction band 1 is disposed for being tensioned by a screw or threaded spindle 2, which is rotatably mounted in a holder 3. One end of the band 1 is secured to a nut 4, adapted for travelling on the screw 2 when the screw is turned. The other end of the band is, in the illustrated embodiment, attached to one leg of a U-shaped leaf spring 5, which is clamped in the holder 3 with the aid of its legs. The U-shaped leaf spring 5 accommodates the band 1 and the legs of the spring 5 straddle the band. The screw 2 is rotatably supported in the other leg of the U-shaped leaf spring 5 and the screw 2 extends substantially in the central plane of the band 1.

Figure 2:
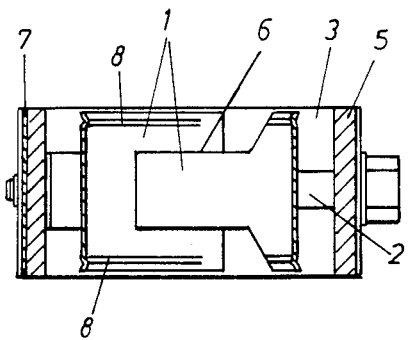
FIG. 2 is a sectional view taken along line A—A in FIG. 1.

In the illustrated embodiment, the end of the constriction band 1 attached to the leg of spring 5 extends through a slit 6 made in the other end of the band, in a manner illustrated in greater detail in FIG. 2.

In accordance with the invention, the clip of FIGS. 1 and 2 is provided with an indication means 7, the function of which will be explained in detail in conjunction with FIG. 3.

Figure 3:
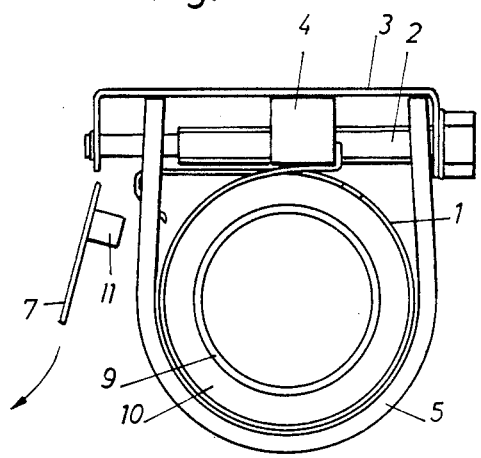
FIG. 3 illustrates the clip of FIG. 1 mounted on a pipe and tightened to a predetermined pressure.

The constriction band 1 is provided on its inner surface with ridges 8 along its edges, and the function of these will also be explained in conjunction with FIG. 3.

In FIG. 3 the clip of FIG. 1 is illustrated as being positioned on a pipe 10, which is, in turn, pushed over the end of a metal nipple 9, not more closely. The pipe 10 is made of plastic that cold flows when subjected to mechanical pressure. The constriction band 1 has been tensioned around the pipe 10 by turning the screw 2 mounted in the holder 3. The pipe 10 is compressed when the band 1 comes into contact with the exterior surface thereof. Since the U-shaped leaf spring 5 was prestressed in the ends of the holder 3, the spring 5 are first caused to be pressed closer together when the pressure of the band 1 against the pipe 10 exceeds the limit corresponding to the initial stress in the spring 5.

The ridges 8, already mentioned, on the inside of the band 1 are adapted such that the size of the surface engaging against the pipe 10 increases with continuing cold flow. There is thus obtained a high superficial pressure, the sealing pressure, directly on tightening the constriction band 1, and also a rapid decrease of the cold flow rate in the pipe material, because the superficial pressure decreases with increased contact surface. Due to the placement of the ridges 8 along the edges of the band 1, the pipe material between the ridges is compelled to flow a longer distance, which further reduces the cold flow rate.

In the initial position, illustrated in FIG. 1, the clip is provided, as mentioned above, with an indication means 7, which is clamped between the inside of the holder 3 and the outside of the movable leg of the spring 5. In the illustrated embodiment of the indication means 7, it is provided with a protuberance 11, which has been slipped, in the initial position illustrated in FIG. 1, through a cutout, in the movable leg of the spring 5 through which the screw 2 is also passed. The length of the protuberance 11 is selected such that the indication means 7 is freed from the clip when the movable leg of the spring 5 has moved a predetermined distance, at least corresponding to the calculated cold flow. Dimensioning of the spring 5 in respect of spring bias and characteristic as well as the implementation of the constriction band 1 and nipple 9 coact such that, with time, the superficial pressure applied by the band 1 against the pipe 10 automatically approaches the pressure the pipe material can withstand.

Accordingly, even if the material in the pipe 10 should cold flow under the tension band 1, the clip will maintain a lasting pressure around the pipe 10.

As a result of the indication means 7, the quality of the sealing joint is established upon release of the indication means and therefor is not affected by the skill of the operator performing the connection.

We claim:

1. A clip for sealingly connecting to a nipple, a pipe composed of a material having capacity for cold flow, said clip comprising a constriction band encircling the pipe and nipple to be connected, said band having overlapping ends adapted for displacement in relation to each other, a nut rigidly attached to one end of the band, a threaded spindle supporting said nut for travel thereon upon rotation of the spindle for displacing said one end of the band relative to the other, and a resilient U-shaped element accommodating the band and including legs straddling the band, the other end of the band being secured to one leg of said U-shaped element, said threaded spindle being mounted for rotation in the other leg of said U-shaped element and disposed substantially in the central plane of the band.

2. A clip as claimed in claim 1 wherein said band is provided with ridges extending proximate its lateral edges on the surface of the band facing the pipe.

3. A clip as claimed in claim 2 comprising an indicating plate retained by said U-shaped element such that when the legs of said U-shaped element are moved towards each other a predetermined distance, on increasing the sealing pressure on the pipe, said indication plate is released from retention by said U-shaped element.

4. A clip as claimed in claim 1 comprising an indicating plate retained by said U-shaped element such that when the legs of said U-shaped element are moved towards each other a predetermined distance, on increasing the sealing pressure on the pipe, said indication plate is released from retention by said U-shaped element.

5. A clip as claimed in claim 4 comprising a holder rotatably supporting said threaded spindle and receiving said legs of said U-shaped element which bear against the holder in an initial pre-stressed state, said indicating plate including one portion initially clamped between said one leg of the U-shaped element and the holder and a protuberance projecting from said one portion through a cut-out in said one leg.

6. A clip as claimed in claim 1 wherein said band has a slit through which said one end of the band is passed.

* * * * *